United States Patent [19]

Masuda

[11] Patent Number: 4,967,377
[45] Date of Patent: Oct. 30, 1990

[54] CONTROL SYSTEM USING COMPUTERS AND HAVING AN INITIALIZATION FUNCTION

[75] Inventor: Shunichi Masuda, Kawasaki, Japan

[73] Assignee: Canon Kabushiki Kaisha, Tokyo, Japan

[21] Appl. No.: 455,907

[22] Filed: Dec. 20, 1989

Related U.S. Application Data

[63] Continuation of Ser. No. 150,438, Feb. 1, 1988, abandoned, which is a continuation of Ser. No. 854,192, Apr. 21, 1986, abandoned, which is a continuation of Ser. No. 446,492, Dec. 3, 1982, abandoned.

[30] Foreign Application Priority Data

Dec. 10, 1981 [JP] Japan ............................ 56-197703
Dec. 10, 1981 [JP] Japan ............................ 56-197704

[51] Int. Cl.$^5$ .................. G06F 1/24; G06F 15/00; G06F 13/10; G03G 21/00
[52] U.S. Cl. ................................ 364/518; 355/204; 364/228.6; 364/229.1; 364/230.5; 364/222; 364/270.7; 364/921.3; 364/931.3; 364/942.4; 364/200
[58] Field of Search ... 364/200 MS File, 900 MS File, 364/518; 355/14 C, 14 R, 204, 264; 371/12

[56] References Cited

U.S. PATENT DOCUMENTS

| 4,188,668 | 2/1980 | Filay | 364/900 |
|---|---|---|---|
| 4,215,396 | 7/1980 | Henry et al. | 364/200 |
| 4,355,354 | 10/1982 | Kempf et al. | 364/200 |
| 4,358,823 | 11/1982 | McDonald et al. | 364/200 |
| 4,398,246 | 8/1983 | Frediani et al. | 364/200 |
| 4,420,247 | 12/1983 | Suzuki et al. | 355/14 C |
| 4,511,240 | 4/1985 | Suzuki et al. | 355/14 R |
| 4,553,204 | 11/1985 | Hashimoto | 371/12 |
| 4,556,310 | 12/1985 | Masuda | 355/14 C |
| 4,569,585 | 2/1986 | Masuda | 355/14 C |
| 4,590,556 | 5/1986 | Berger et al. | 364/200 |
| 4,614,880 | 9/1986 | Go et al. | 364/707 |
| 4,633,405 | 12/1986 | Ito et al. | 355/14 C |

FOREIGN PATENT DOCUMENTS

59-87558 5/1984 Japan .

Primary Examiner—Gareth D. Shaw
Assistant Examiner—Paul Wayner
Attorney, Agent, or Firm—Fitzpatrick, Cella, Harper & Scinto

[57] ABSTRACT

A control system using a plurality of microcomputers prevents data transfer error by allowing execution of control programs by the respective microcomputers only after all the microcomputers have been initialized. The control system may be used for controlling, for example, a copying machine and a sorter.

8 Claims, 12 Drawing Sheets

CONTROL SYSTEM USING COMPUTERS AND HAVING AN INITIALIZATION FUNCTION

This application is a continuation of application Ser. No. 07/150,438 filed Feb. 1, 1988, now abandoned, which was a continuation of application Ser. No. 06/854,192 filed Apr. 21, 1986, now abandoned, which was a continuation of application Ser. No. 06/446,492 filed Dec. 3, 1982, now abandoned.

BACKGROUND OF THE INVENTION

1. Field of the Invention:

The present invention relates to a control system using a plurality of computers and, more particulary, to a control system using a plurality of microcomputers for controlling a copying machine main body and its peripherals.

2. Description of the Prior Art

Recently, tremendous advances have been made in electronic techniques. In particular, with the recent trend toward higher integration of electronic circuits, high-performance one-chip microcomputers are used for a variety of equipment. Microcomputer-aided control of a copying machine is becoming popular. With requirements for higher performance, higher operation speed and multipurpose operability, a plurality of microcomputers are used in place of a single microcomputer so as to control the copying machine main body and its peripherals (sorter, ADF and the like) separately in accordance with different functions. For this purpose, parallel or serial data transfer through intelligent terminals using I/O ports of the microcomputers is being developed.

In a system wherein control power supplies for the respective microcomputers are separately provided, problems due to the rise of the control power supply voltage at the initial power ON, that is, problems of operation timing of the respective microcomputers, or problems of data transfer error due to the states of the I/O ports during the initial reset (initialization) of the respective microcomputers, are encountered during data transfer. The copying machine main body or any one of its peripherals may as a consequence operate erratically.

SUMMARY OF THE INVENTION:

The present invention has been made in consideration of the above situation and has for its object to allow reliable data transfer between a plurality of microcomputers of a control system.

It is another object of the present invention to allow initial synchronization for data transfer when data transfer is to be performed between a plurality of microcomputers.

It is still another object of the present invention to prevent erratic operation of a plurality of pieces of equipment when they are controlled by a plurality of microcomputers.

It is still another object of the present invention to prevent data transfer error among plurality of microcomputers at the time of power ON when these microcomputers are used for controlling a copying machine main body and its peripherals.

DETAILED DESCRIPTION OF THE PREFERRED EMBODIMENT:

The preferred embodiment of the present invention will now be described with reference to the accompanying drawings.

Figure 1:
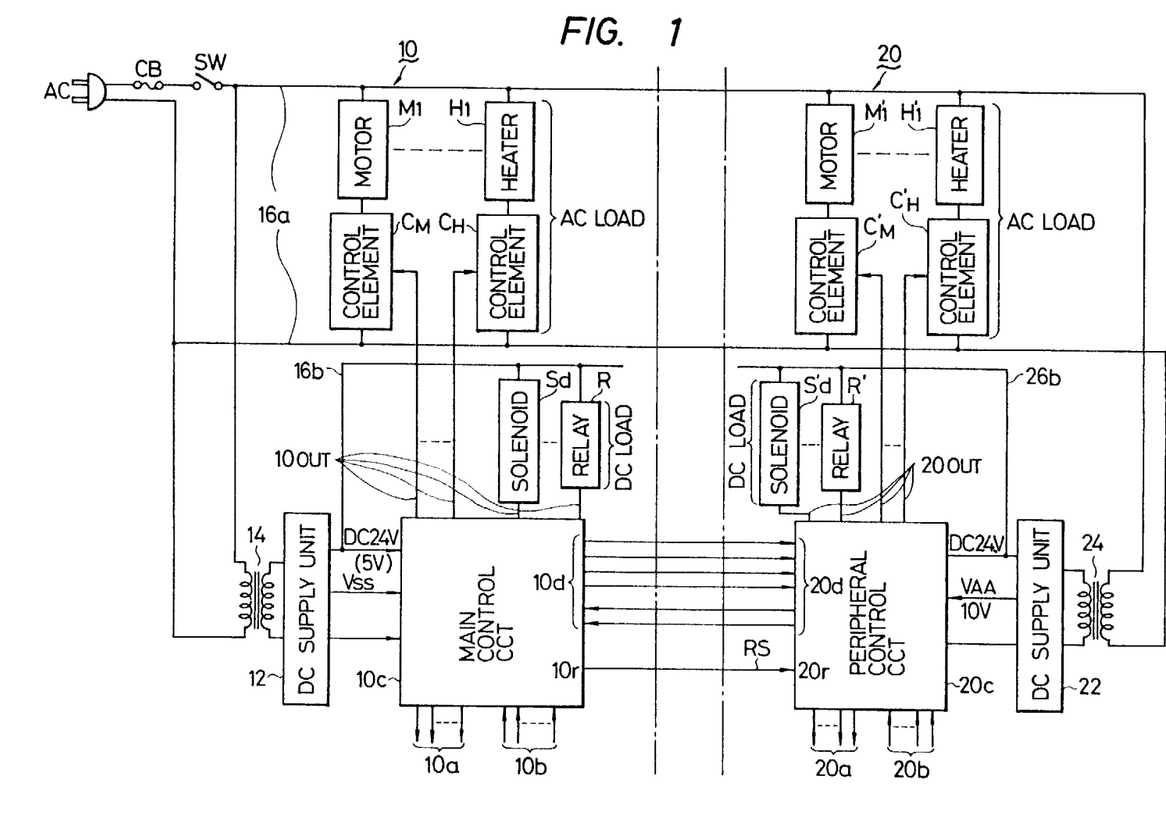
FIG. 1 is a block diagram of a copying machine main body and its peripherals according to an embodiment of the present invention.

FIG. 1 is a block diagram of a copying machine main body and its peripherals to which a control system using microcomputers of the present invention is applied. A copying machine main body 10 comprises a main control circuit 10c, a DC supply unit 12 for suppying DC power to the main control circuit 10c, and a transformer 14 for supplying predetermined AC power from an AC power supply terminal AC to the DC power supply unit 12. AC loads such as a drive motor $M_1$ and a heater $H_1$ necessary for driving operation of the drum are connected to an AC line 16a, whereas DC loads such as a solenoid Sd and a relay R are connected to a DC line 16b. The photosensitive drum is driven by the drive motor $M_1$. Control elements $C_M$ and $C_H$ respectively comprising, for example, a solid state relay (SSR), control the drive motor $M_1$ and the heater $H_1$. A fuse CB and an AC power switch SW are connected to the AC power supply terminal. The main control circuit 10c includes a microcomputer for the copying machine main body (to be referred to as a microcomputer A for main hereinafter) to be described later. Control outputs $10_{OUT}$ from this microcomputer for main control the AC and DC loads through drive circuits (not shown). The main control circuit 10c has output ports 10a for producing control signals other than that for controlling the driving operation of the drum, and input ports 10b for receiving a timing sensor signal, a paper detection signal of a copying paper sheet, or a signal necessary for control of the copying operation. The main control circuit 10c further has I/O ports 10d for transfer of various types of data to or from a microcomputer for the peripherals (to be referred to as a microcomputer B for peripheral). For example, the microcomputer A for main supervises the process sequence of the copying machine main body or the operation state of the peripherals to facilitate suitable operation of the copying machine main body and the peripherals. The main control circuit 10c has a reset signal output terminal 10r which produces a reset signal RS to reset the microcomputer B for peripheral during the initialization of the system.

Power is supplied from the copying machine main body 10 to its peripherals 20. The peripherals 20 are controlled by the microcomputer B for peripheral within a peripheral control circuit 20c. AC loads such as a drive motor $M'_1$ and a heater $H'_1$ are connected to the AC line 16a, whereas DC loads such as a solenoid $Sd'$ and a relay $R'$ are connected to a DC line 26b. The peripheral control circuit 20c has output ports 20a and input ports 20b for peripheral control, I/O ports 20d for data transfer to and from the microcomputer A for main, and a reset signal input terminal 20r. The peripherals 20 include a transformer 24 and control elements $C'_M$ and $C'_H$. Control outputs $200_{OUT}$ are produced from the peripheral control circuit for controlling its AC and DC loads.

In the control system as described above, the control circuits 10c and 20c comprise separate microcomputers and are supplied with power from separate power supplies. However, AC power is supplied from the copying machine main body. When the microcomputers have separate power supplies and power is supplied to the microcomputers from the copying machine main body, the stabilizing capacity of the microcomputer B for peripheral is smaller than that of the microcomputer A for main. For this reason, the microcomputer B for peripheral more frequently erratically operates due to noise or dropout of the power supply line. In a control system in which the microcomputers have separate power supplies, the start timings of the respective microcomputers are different due to the different rise times of the DC power supply units 12 and 22. In particular, when data transfer is performed between microcomputers, data transfer error tends to be caused due to incorporation of interfaces. The control system of the present invention prevents such data transfer error by controlling the reset signal output terminals 10r and 20r of the control circuits 10c and 20c, respectively.

Figure 2:
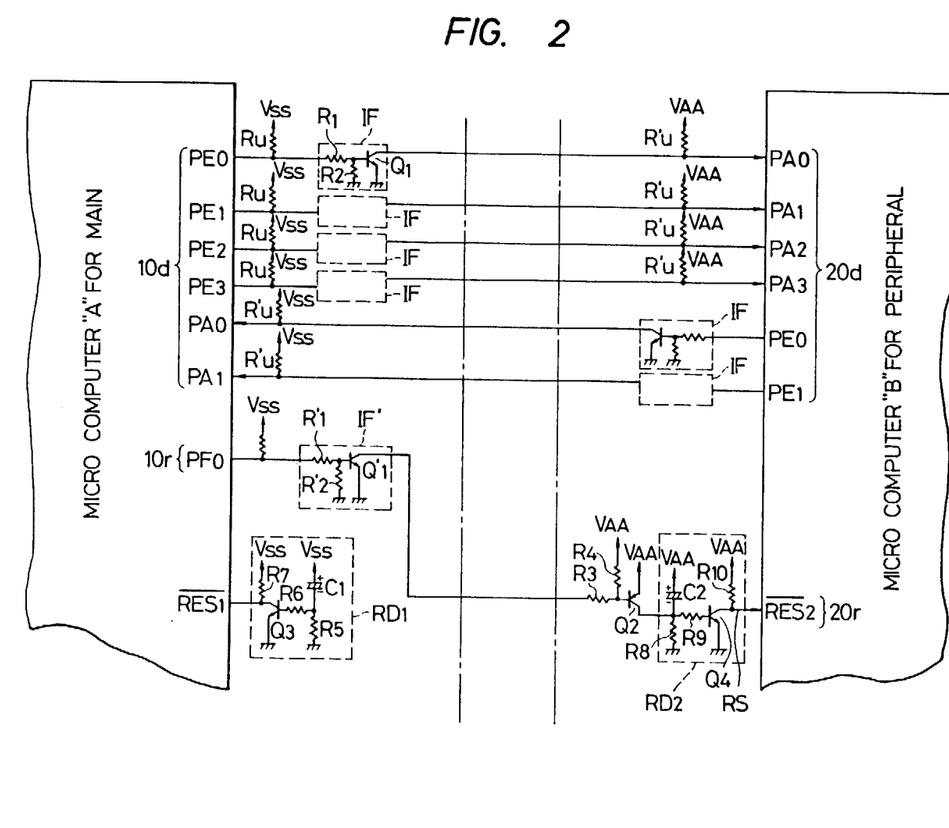
FIG. 2 is a circuit diagram showing the details of the control circuit sections shown in FIG. 1.

FIG. 2 is a circuit diagram of interfaces and reset drive circuits for data transfer between the microcomputer A for main and the microcomputer B for peripheral. Interfaces IF are interposed between transfer ports $PE_0$ to $PA_1$ of the microcomputer A for main and transfer ports $PA_0$ to $PE_1$ of the microcomputer B for peripheral. Each interface IF comprises resistors $R_1$ and $R_2$ and a transistor $Q_1$ and is connected to a pullup resistor $R_u$ or $R'_u$. A reset control port or an output port $PF_0$ of the microcomputer A for main is connected to an interface IF' comprising resistors $R'_1$ and $R'_2$ and a transistor $Q'_1$. The interface IF' is connected to a reset drive circuit $RD_2$ for supplying a reset signal to a reset terminal $\overline{RES_2}$ of the microcomputer B for peripheral through a transistor $Q_2$ and the like. The reset drive circuit $RD_2$ comprises a transistor $Q_4$ and a charging circuit consisting of a capacitor $C_2$ and a resistor $R_8$ and so on. A reset drive circuit $RD_1$ supplies a reset signal to a reset terminal $\overline{RES_1}$ of the microcomputer A for main. The reset drive circuit $RD_1$ comprises a transistor $Q_3$ and a charging circuit consisting of a capacitor $C_1$ and a resistor $R_5$, and so on.

The mode of operation of the control system as described above will now be described. During a predetermined time period required for resetting the microcomputers after power is turned ON, a signal of LOW level is supplied to the reset terminals $\overline{RES_1}$ and $\overline{RES_2}$ of the respective microcomputers. When the output port $PF_0$ is set (HIGH or H level) to turn ON transistors $Q'_1$ and $Q_2$ during the initialization of the microcomputer A for main, the transistor $Q_4$ of the-reset drive circuit $RD_2$ is turned ON and the reset terminal $\overline{RES_2}$ goes low. The microcomputer B for peripheral is kept reset after the predetermined time period elapses since the reset control port $PF_0$ of the microcomputer A for main is set. After the microcomputer A for main is initialized, the reset control port $PF_0$ is reset (LOW or L level) to turn OFF the transistors $Q'_1$ and $Q_2$, thus releasing the reset state of the microcomputer B for peripheral. After the initialization synchronization is performed in this manner, predetermined data transfer is performed through the transfer ports $PE_0$ to $PA_1$ and $PA_0$ to $PE_1$.

Figure 3A:
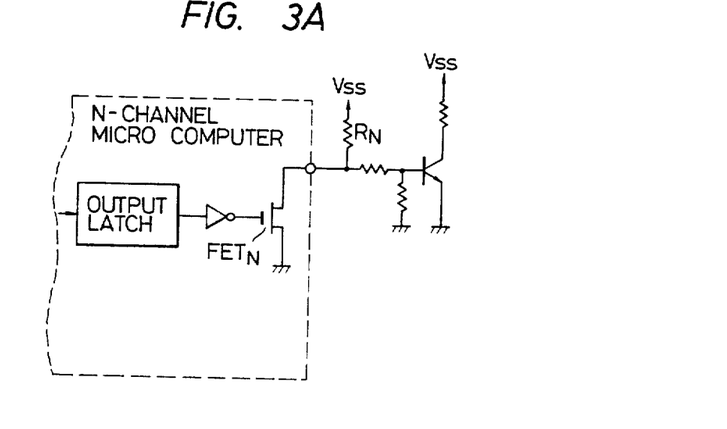
FIGS. 3A and 3B are circuit diagrams of output ports of an n-channel microcomputer and a p-channel microcomputer each constituting the control circuit shown in FIGS. 2 and 8.
Figure 3B:
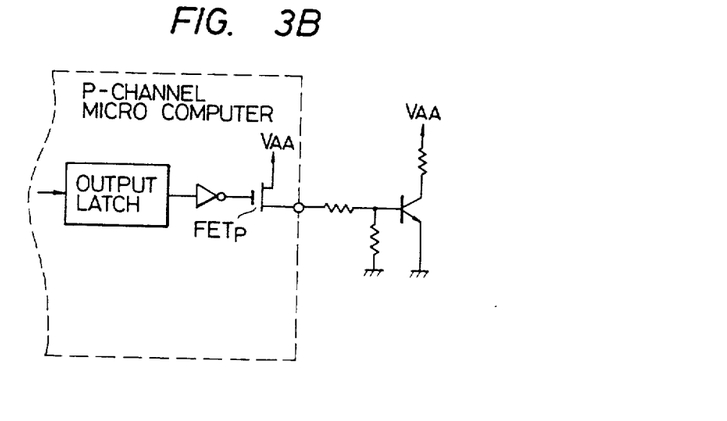

FIGS. 3A and 3B are respectively circuit diagrams of n- and p-channel output transistors $FET_N$ and $FET_P$ of open drain type for the microcomputers. When the microcomputers are reset, the output transistor $FET_N$ is pullup-connected with a resistor $R_N$, it goes to H level. If the p-channel output transistor $FET_P$ is pulldownconnected with a resistor, it goes to L level. In this manner, the output and input states during resetting are different for each microcomputer depending on whether the microcomputer is of n- or p-channel type. This causes data transfer error together with different rise times after power is turned ON.

Figure 4:
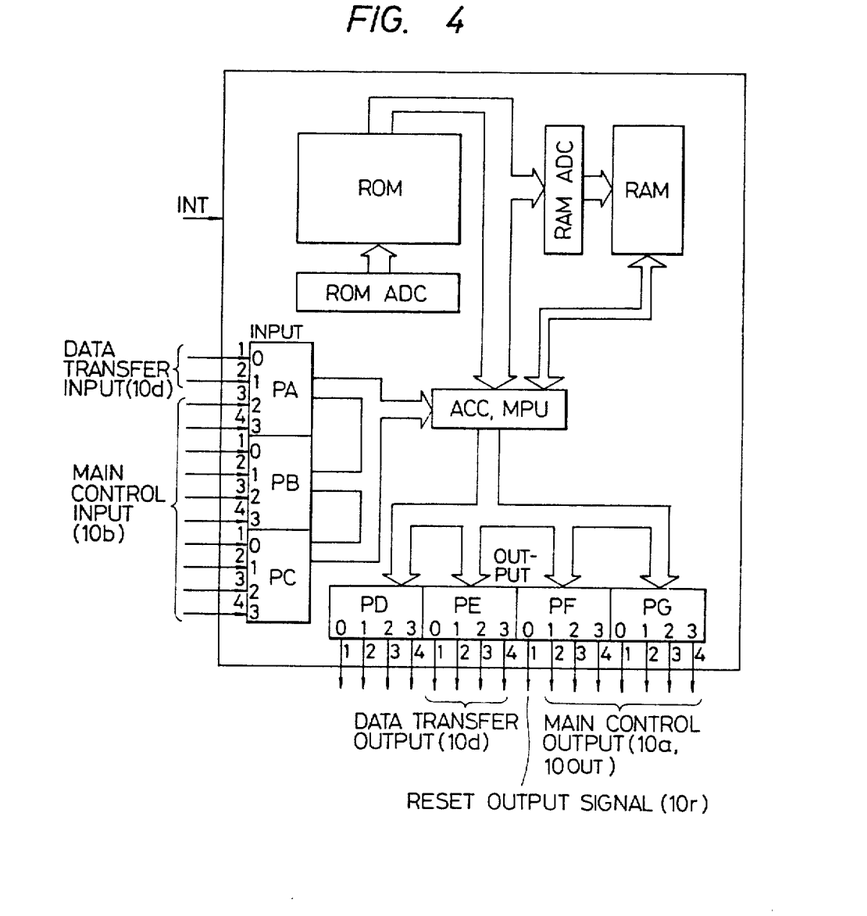
FIG. 4 is a block diagram showing the internal configuration of a microcomputer constituting the control circuit for the copying machine main body shown in FIG. 2.
Figure 5:
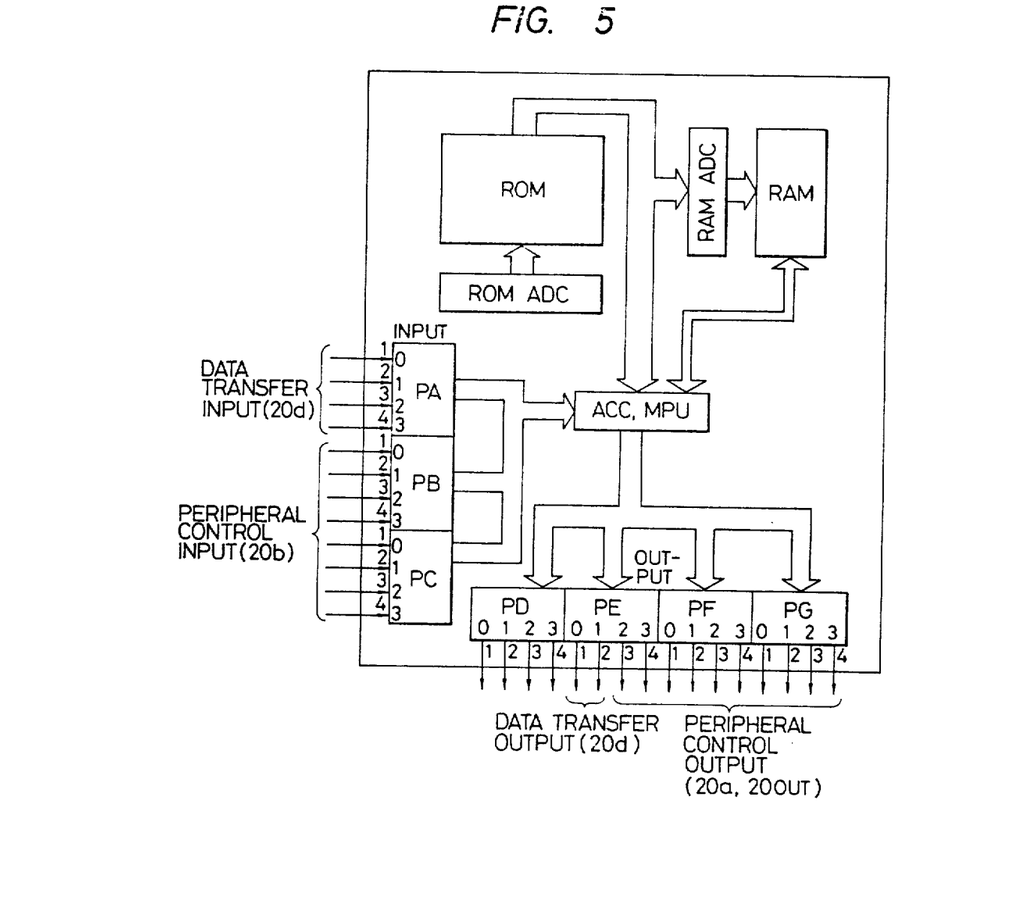
FIG. 5 is a block diagram showing the internal configuration of a microcomputer constituting the control circuit for the peripherals shown in FIG. 2.

FIGS. 4 and 5 are block diagrams of 4-bit onechip microcomputers A and B for main and peripheral, respectively, each having a ROM, a RAM, an ACC, and I/O ports PA, PB, PC, PD, PE, PF and PG.

The I/O ports in FIG. 4 respectively correspond to the I/O ports of the main control circuit 10c shown in FIG. 1, while the I/O ports in FIG. 5 respectively correspond to those of the peripheral control circuit 20c shown in FIG. 1.

Figure 6:
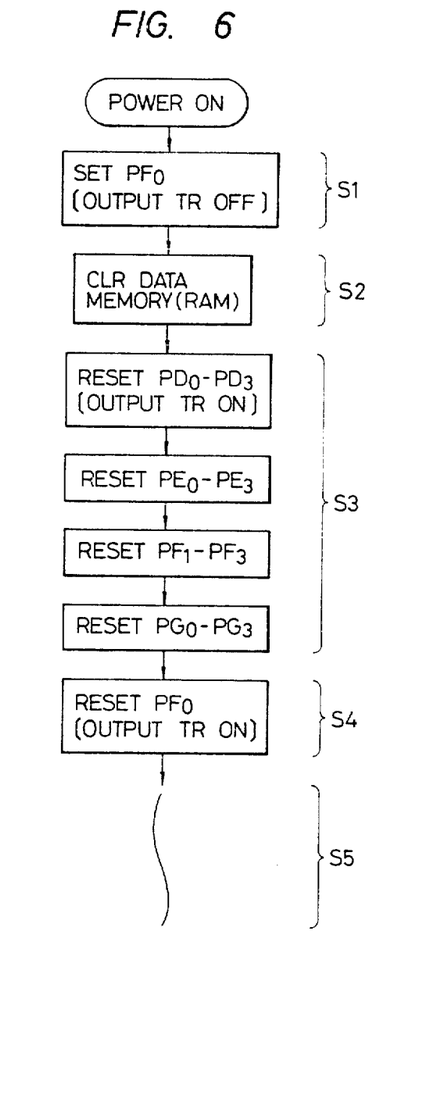
FIG. 6 is a flowchart for the microcomputer for the copying machine main body shown in FIG. 2.

The control system of the first embodiment of the present invention has the configuration as described above, and its mode of operation will now be described with reference to the circuit diagram shown in FIG. 2 and the flowchart in FIG. 6. After power is ON, in step S1, the output port $PF_0$ for controlling the reset drive circuit of the microcomputer B for peripheral is set, that is, the output transistor $FET_N$ is turned OFF. N-channel output transistors are used in the microcomputer A for main in the present invention. Since the n-channel output transistors are turned OFF during the initialization, the ports $PE_0$ to $PE_1$, $PF_0$ and so on are at H level if they are pulled up to the power supply voltage with resistors. When the reset control port $PF_0$ is at H level, the transistors $Q'_1$ and $Q_2$ are turned ON, and the transister $Q_4$ in the reset drive circuit $RD_2$ of the microcomputer B for peripheral is turned ON to forcibly reset the microcomputer B for peripheral. In step S2, the RAM as data memory is cleared, and the sequence advances to step S3. In step S3, all the output ports PD to PG except for the reset control port $PF_0$ are reset. That is, the output transistors are turned ON so that all the outputs are at L level. After all the outputs go low, the reset control $PF_0$ is reset (L level) in step S4 to release the reset drive circuit $RD_2$ of the microcomputer B for peripheral.

In step S5 and thereafter, a data transfer program or a copying control program is executed. More specifically, after all the output ports of the microcomputer A for main having the reset control port $PF_0$ are set to L level (after initialization is completed), reset of the program of the microcomputer B is released to start the program, thereby achieving synchronization of data transfer.

In the embodiment described above, since the microcomputer B for peripheral uses p-channel transistors, all the output ports of the microcomputer B for peripheral are kept at L level during the resetting operation of the microcomputer B for peripheral. Therefore, in the case of program start for both microcomputers, the program start may be performed with the output ports of the respective microcomputers kept at L level (H level at the input ports) so that initial synchronization for data transfer may be performed. Although the above description is made with respect to a case wherein the present invention is applied to a copying machine main body and its peripherals, the present invention is similarly applicable to initial synchronization of data transfer in any control system using a plurality of microcomputers in which respective pieces of control equipment are controlled by separate computers.

In a control system using a plurality of microcomputers according to the embodiment of the present invention described above, during initialization of a given computer after power is turned ON, the reset means for microcomputers to exchange data is controlled to achieve initial synchronization of data transfer, thereby preventing data transfer error.

In the above embodiment, a reset drive circuit is incorporated for each microcomputer. However, a single reset drive circuit may be commonly used for all the microcomputers.

Another embodiment of the present invention will now be described.

Figure 7:
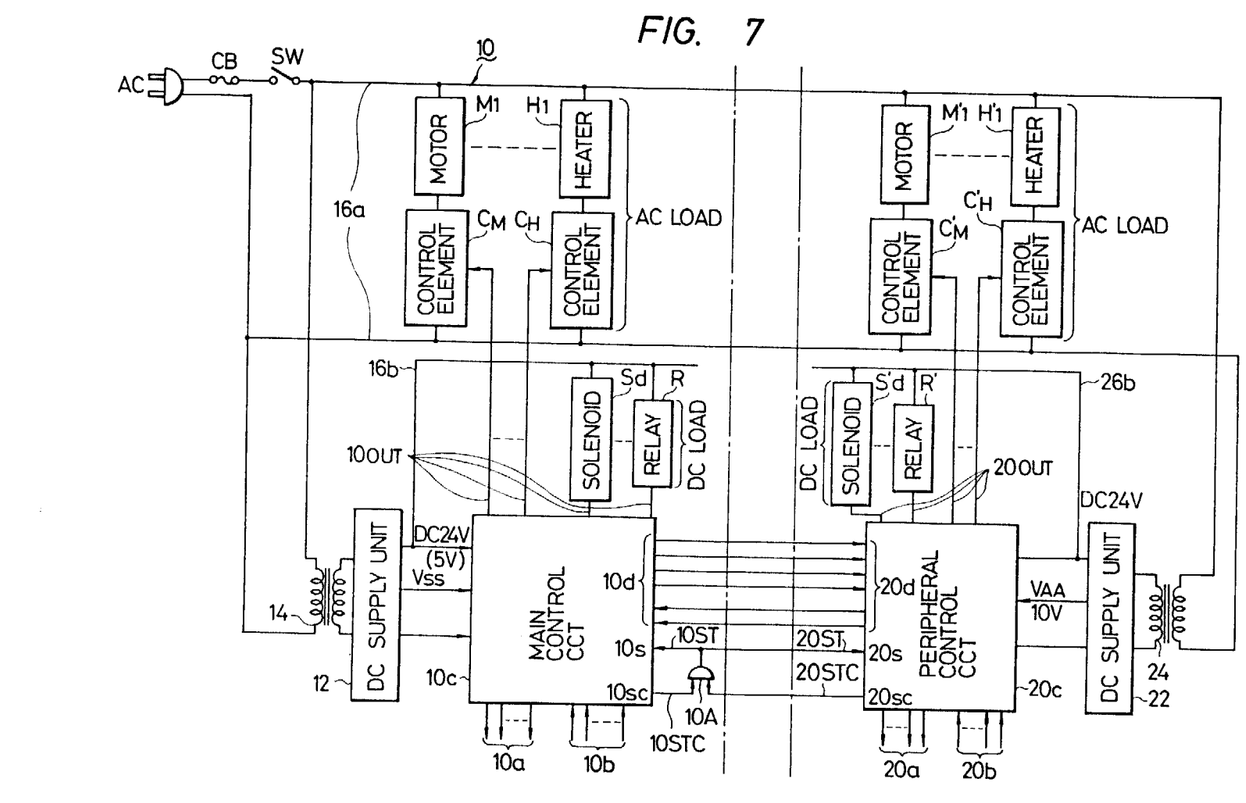
FIG. 7 is a block diagram of a copying machine main body and its peripherals according to another embodiment of the present invention.

FIG. 7 is a block diagram of a control system with microcomputers. As in FIG. 1, a main control circuit 10c includes a microcomputer A for main, while a peripheral control circuit 20c includes a microcomputer B for peripheral. The same reference numerals as in FIG. 1 denote the same parts in FIG. 7, and detailed description thereof will be omitted.

Referring to FIG. 7, the main control circuit 10c has an output port 10SC for producing a start command signal 10STC when initialization is completed after power is turned ON. The output port 10SC is connected to one input end of an AND gate 10A whose output end is connected to an input port 10S for receiving a start signal 10ST.

The peripheral control circuit 20c has an output port 20SC for producing a start command signal 20STC. The output port 20SC is connected to the other input end of the AND gate 10A. The peripheral control circuit 20c further has an input port 20S which receives a start signal 20ST and which is connected to the output end of the AND gate 10A.

In the control system as shown in FIG. 7, as in FIG. 1, the respective microcomputers have separate power supplies, and microcomputer power is supplied from the copying machine main body. Therefore, the microcomputers may erratically operate due to noise or dropout of the power supply lines. In a control system wherein microcomputers have separate power supplies, the respective microcomputers have different start timings due to the different rise times of DC power supply units 12 and 22 after power is turned ON. In a control operation involving data transfer between a plurality of microcomputers, interfaces for data transfer are further involved to increase the rate of data transfer error.

In this embodiment, in order to prevent data transfer error, the start signals produced after initialization of the respective microcomputers are supplied to an AND gate, and the output from the AND gate is provided to start the control programs, thereby preventing data transfer error.

Figure 8:
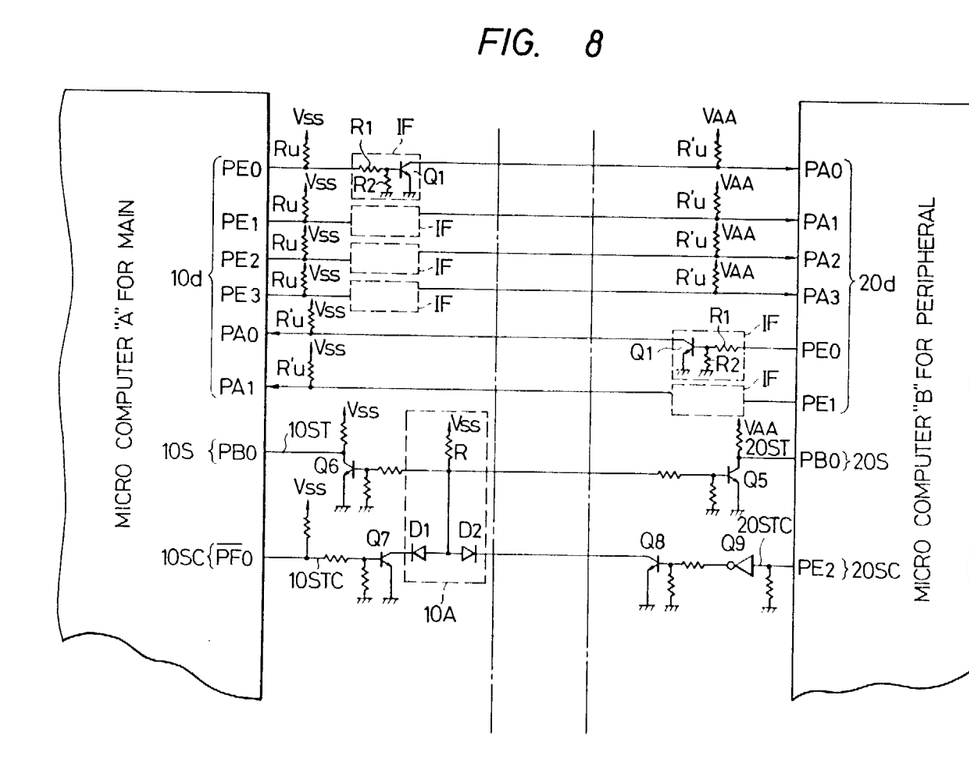
FIG. 8 is a circuit diagram showing the details of the control circuit sections of control circuits shown in FIG. 7.

FIG. 8 is a circuit diagram including interfaces for data transfer between the microcomputer A for main and the microcomputer B for peripheral, a circuit for producing the start command signals 10STC and 20STC and start signals 10ST and 20ST, and an AND gate 10A. Each interface IF is connected between one of transfer ports $PE_0$ to $PA_1$ of the microcomputer A for main and a corresponding one of transfer ports $PA_0$ to $PE_1$ of the microcomputer B. Each interface IF comprises resistors $R_1$ and $R_2$ and a transistor $Q_1$, and is connected to a pullup resistor $R_u$ or $R'_u$. The output $\overline{PF_0}$ (10SC) for producing the start command signal 10STC from the microcomputer A for main is connected to a diode $D_1$ through a transistor $Q_7$ and the like. The output $PE_2$ (20SC) for producing the start command signal 20STC from the microcomputer B for peripheral is connected to a diode $D_2$ through an inverter $Q_9$ and a transistor $Q_8$ or the like, and is pullup-connected to the power supply through a resistor R. The diodes $D_1$ and $D_2$ comprise the AND gate 10A. Unless both the transistors $Q_7$ and $Q_8$ are OFF, the anodes of the diodes of the AND gate 10A are not at H level.

After the microcomputer A for main is initialized, the output port $PF_0$ is reset (L level) by the start command signal 10STC so as to turn OFF the transistor $Q_7$. Similarly, after the microcomputer B for peripheral is initialized, the output port $PE_2$ is set (H level) by the start command signal 20STC in order to turn OFF the transistor $Q_8$. Then, the cathodes of the diodes $D_1$ and $D_2$ of the AND gate 10A are at ground level to satisfy the AND conditions. In this manner, only after both start command signals 10STC and 20STC are produced from the microcomputers A for main and the microcomputer B for peripheral, respectively, the output from the AND gate 10A (anodes of the diodes $D_1$ and $D_2$) goes to H level. Then, transistors $Q_6$ and $Q_5$ connected to input ports $PB_0$ are turned ON. The start signals 10ST and 20ST of L level are respectively supplied to the input ports $PB_0$ (10s and 20s). In this circuit configuration, the start command logics for the microcomputer A for main and the microcomputer B for peripheral are different since the microcomputer A for main has n-channel output transistors while the microcomputer B for peripheral has p-channel output transistors in this embodiment, as has been described with reference to FIG. 3.

Depending on whether the output transistors used for the microcomputers are of p- or n-channel type, the output and input states during resetting are different. This, together with the difference in the rise times of the power supplies at the time of power ON, may give rise to data transfer error. In this embodiment, the start command signals 10STC and 20STC are produced after completion of the respective microcomputers to solve this problem, as has been described earlier.

Figure 9:
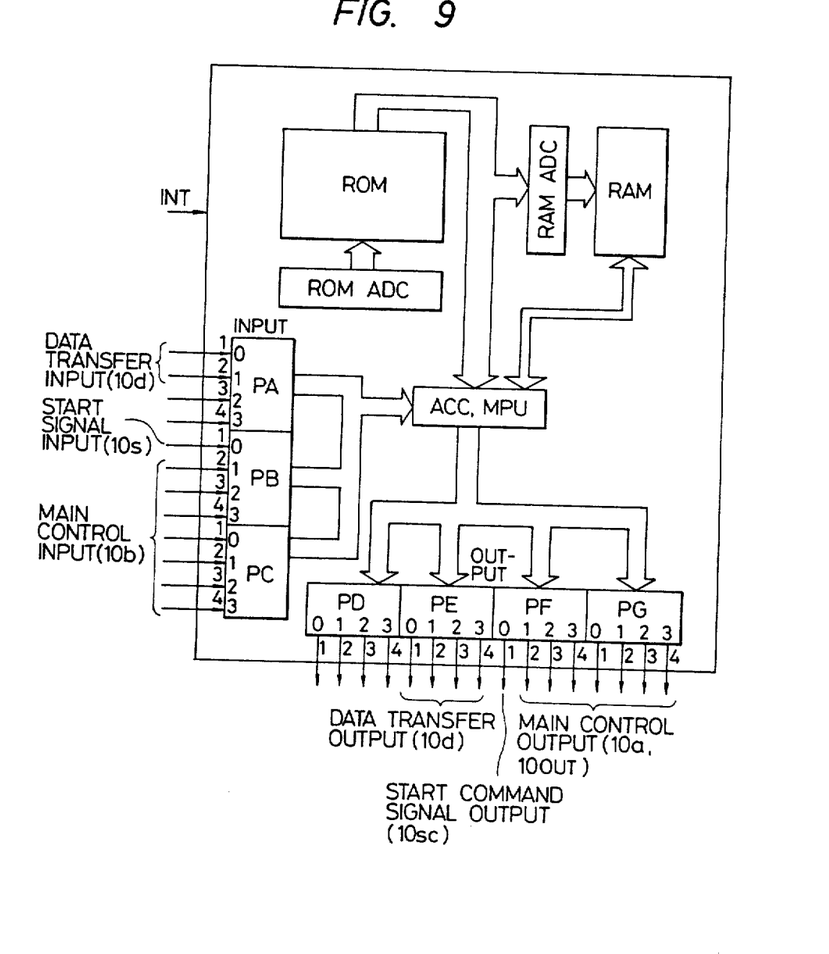
FIG. 9 is a block diagram showing the internal configuration of a microcomputer constituting the control circuit for the copying machine main body shown in FIG. 8.
Figure 10:
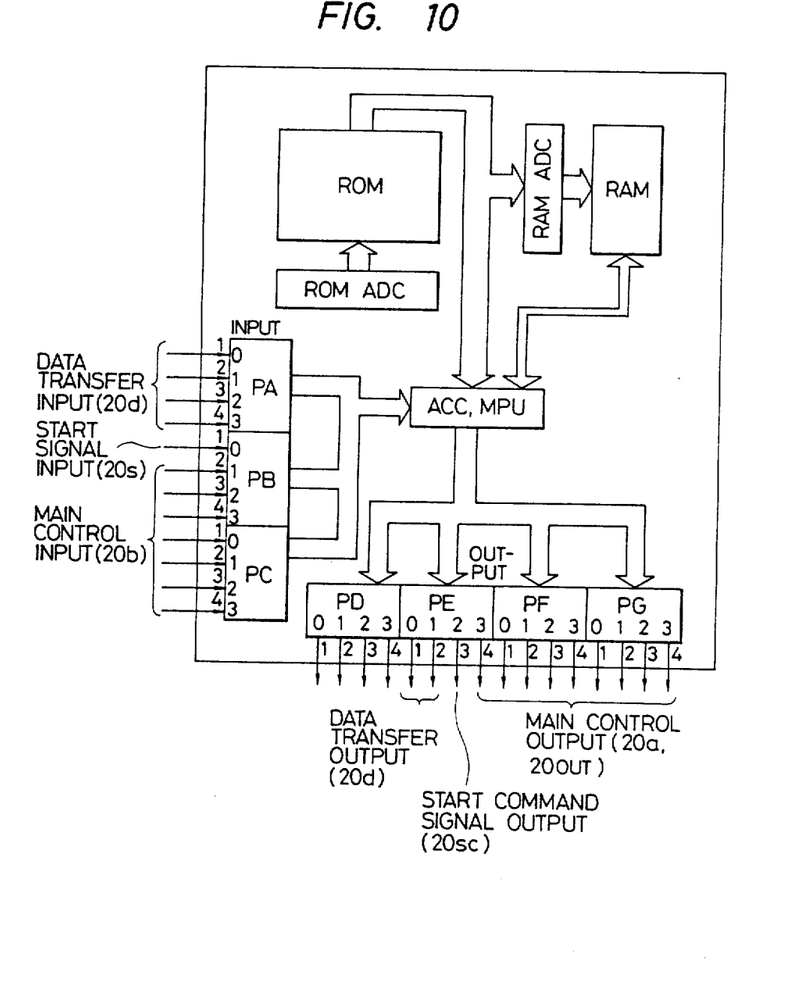
FIG. 10 is a block diagram showing a microcomputer constituting the control circuit for the peripherals shown in FIG. 8.

FIGS. 9 and 10 are block diagrams of 4-bit onechip microcomputers A and B for main and peripheral, each of which comprises a ROM, a RAM, ACC and I/O ports PA, PB, PC, PD, PE, PF and PG.

The I/O ports shown in FIG. 9 correspond to the input and output ports of the main control circuit 10c shown in FIG. 7, while the I/O ports shown in FIG. 10 correspond to the input and output ports of the peripheral control circuit 20c shown in FIG. 7.

Figure 11A:
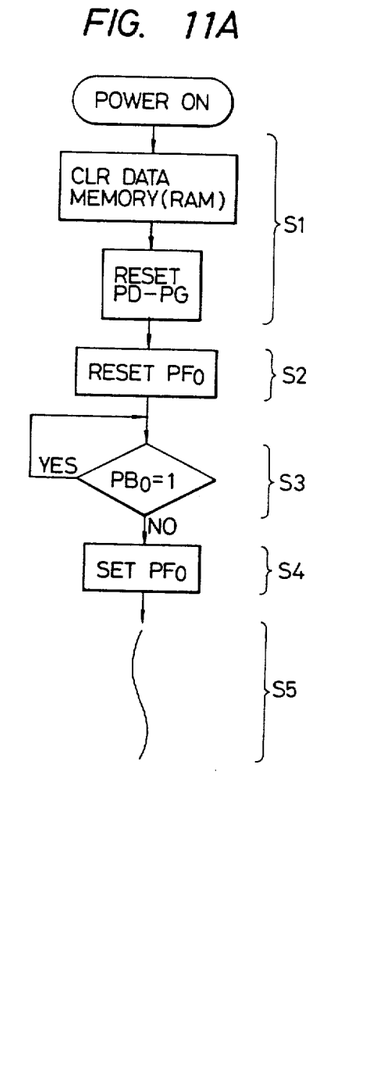
FIGS. 11A and 11B are flowcharts for the microcomputers constituting the control circuits for the copying machine main body and the peripherals, respectively, shown in FIG. 8.

The control system of the second embodiment has the configuration as described above, and its mode of operation will be described with reference to the block diagram shown in FIG. 8 and the flowcharts shown in FIGS. 11A and 11B.

The mode of operation of the microcomputer A for main incorporated within the copying machine main body will first be described with reference to FIG. 11A. After power is ON, in step S1, the data memory RAM is cleared, and the output ports PD to PG except for the output Port $PF_0$ are reset (output transistors ON). Since the microcomputer A uses n-channel output transistor, the output transisteors are turned OFF during resetting and the output ports go to H level. Therefore, all the output ports must be kept at L level during microcomputer start. This is particularly so when the respective loads are directly driven by NPN transistors of the output ports. After initialization is completed, that is, after the RAM is cleared and all the output ports are reset in step S1, the output port $PF_0$ is reset in step S2 so as to produce a start command signal. When the output port $PF_0$ is reset, it goes to L level and the transistor $Q_7$ is turned OFF. At this time, even if the transistor $Q_7$ is OFF, the transistors $Q_6$ and $Q_5$ for receiving the start signals 10ST and 20ST of the microcomputer A for main and the microcomputer B for peripheral respectively remain OFF, whether the transistor $Q_8$ of the microcomputer B for peripheral is OFF. In step S3, it is discriminated whether the start signal 10ST at the input port $PB_0$ is at H level. If the start command signal 20STC is produced from the microcomputer B for peripheral, the transistor $Q_6$ is ON so that the input port $PB_0$ is at L level. If NO in step S3 in this manner, the sequence advances to step S4. In step S4, the output port $PF_0$ for producing the start command signal 10STC is set, and the program advances to step S5. In step S5 and thereafter, the control program and the program for data transfer, copying operation control and the like are executed. At this time, the microcomputer B for peripheral has also completed initialization so that data transfer is performed substantially concurrently and no data transfer error at the time of power ON is caused.

Figure 11B:
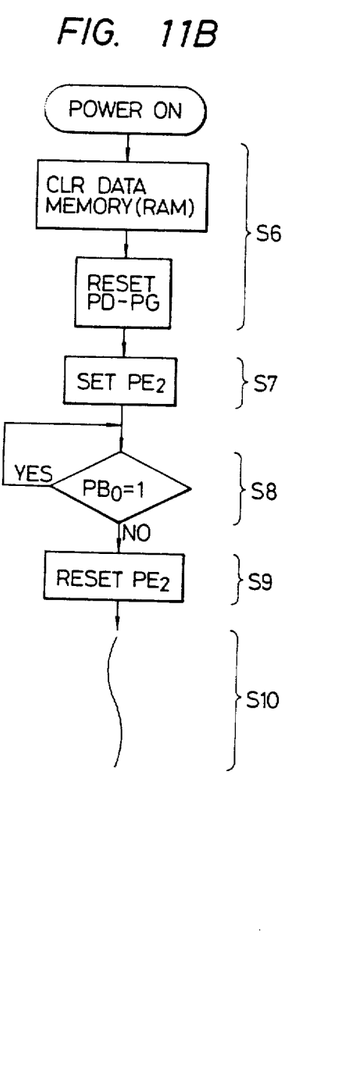

Referring to FIG. 11B, the mode of operation of the microcomputer B for peripheral is similar to that of the microcomputer A for main. In step S6 after power is ON, the data memory RAM is cleared, and the output ports PD to PG are reset (since p-channel output transistors are used, the transistors are turned OFF by resetting and the output ports are thus kept at L level. For this reason, the output ports need not be set to L level). In step S7, the output port $PE_2$ is set to produce the start command signal 20STC. In step S8, the start signal 20ST is checked, that is, it is discriminated whether the input port $PB_0$ of the microcomputer B is H level. If NO in the step S8, the sequence advances to step S9. In step S9, the output port $PE_2$ is reset, and in step S10, the control program is executed.

In a control system with a plurality of microcomputers according to the present invention, means is provided for producing a signal when initialization of each microcomputer is completed after power is turned ON. When the signals from such means for all microcomputers are received, execution of the control program is initiated. Therefore, data transfer error is prevented.

Figure 12:
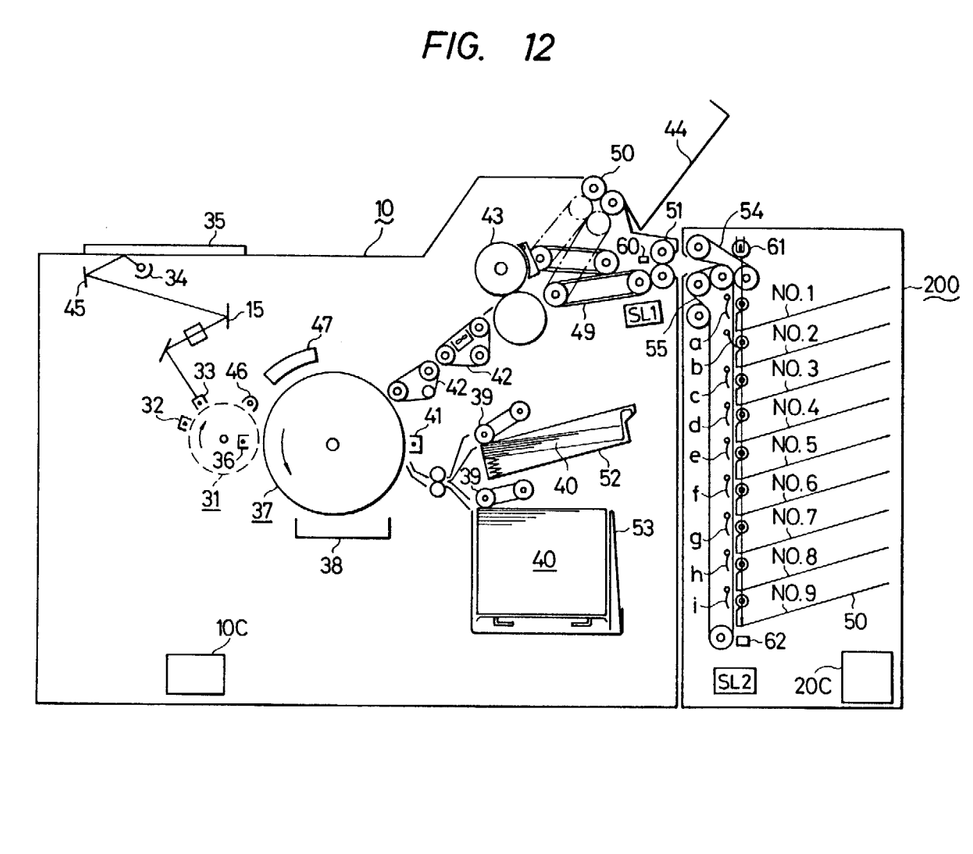
FIG. 12 is a schematic diagram of a copying machine and a sorter to which the present invention can be applied.

FIG. 12 is a schematic sectional view of a copying machine and a sorter to which the present invention may be applied. Referring to FIG. 12, a main control circuit 10c controls the driving operation of a copying machine main body 10, while a peripheral control circuit 20c controls the opertion of a sorter 200 as an example of a peripheral. The copying machine main body and the sorter include a photosensitive screen 31, a primary charger 32, a secondary charger 33, a lamp 34, an original table 35, a modulating charger 36, and insulating drum 37, a developing unit 38, pickup rollers 39 for picking up transfer paper sheets 40, a transfer charger 41, conveyor belts 42, fixing rollers 43, a tray 44, the sorter 200, and nine bins 50. An original placed on the original table 35 is slit-exposed while the mirror 45 and the lamp 34 are moved. The light reflected by the original is incident on a three-layered photosensitive screen 31 simultaneously with the charging operation of the secondary charger 33, the screen 31 having previously been charged by the primary charger 32. An electrostatic latent image is thus formed on the screen 31. The primary electrostatic latent image thus formed is converted into a secondary electrostatic latent image by the modulating charger 36 and the image is visualized by the developing unit 38. The toner image thus obtained is transferred by the transfer charger 41 into the transfer paper sheet 40 supplied from a cassette 52 or 53. The transfer paper sheet 40 is conveyed to the fixing rollers 43 to fix the toner image, and the transfer paper sheet 40 with the fixed image thereon is exhausted into the tray 44. The primary electrostatic latent image is not erased after the secondary electrostatic latent image is formed. Therefore, the screen is rotated for another revolution to form a secondary electrostatic latent image by the modulating charger 36. The transfer paper sheets 40 are sequentially fed to repeat transfer fixing and exhausting operations.

A charge removal lamp 46 removes the charge on the screen before exposure, and a cleaning blade 47 cleans any residual toner from the insulating drum 37 after each copying operation. When the sorter is selected by a control key (not shown), conveyor belts 49 are so set that the transfer paper sheet is exhausted through exhaust rollers 51, as indicated by the solid line. The transfer paper sheet supplied to the sorter 200 is carried by a constantly moving conveyor belt 55 to be supplied to one of bins (Nos. 1 to 9). Guide pawls a to i are arranged for the respective bins, and are sequentially operated each time a sensor 60 senses a transfer paper sheet. The transfer paper sheets are thus sequentially supplied to the respective bins.

In summary, according to the present invention, data transfer among a plurality of microcomputers may be performed correctly, and erratic operation of equipment controlled by these microcomputers may be prevented.

The present invention is not limited to the particular embodiments described above, and various other changes and modifications may be made within the spirit and scope of the present invention.

What I claim is:

1. An image reproduction system, comprising:
   an image reproducing apparatus;
   a peripheral apparatus additionally attached to said reproducing apparatus;
   first one chip computer means provided with a data memory, a processor and a memory storing a program for operation control of said peripheral apparatus;
   second one chip computer means having a data memory, a processor and a memory storing a program for operation control of said image reproducing apparatus, for communicating data with said first one chip computer means;
   first reset means for resetting said first one chip computer means for a predetermined period of time in response to the power source being turned on, wherein said first reset means also resets said first one chip computer means during the period of time of initialization of said second one chip computer means in response to a control signal from said second one chip computer means which indicates the initialization of said second one chip computer means and said first reset means cancels the reset of said first one chip computer means in response to a control signal which indicates the completion of initialization of said second one chip computer means,
   wherein said second one chip computer means clears its memory during the initialization.

2. An image reproduction system according to claim 1, further comprising second reset means for resetting said second one chip computer means, said first one chip computer means being kept reset on the basis of the control signal from said second one chip computer means until initialization of said second one chip computer means is completed.

3. An image reproduction system, comprising:
   an image reproducing apparatus;
   a peripheral apparatus additionally attached to said reproducing apparatus;
   first one chip computer means provided with a data memory, a processor and a memory storing a program for operation control of said peripheral apparatus;
   second one chip computer means having a data memory, a processor and a memory storing a program for operation control of said image reproducing apparatus, for communicating data with said first one chip computer means; and
   means for allowing the start of the operation control program of both said first and second one chip computer means by sending a predetermined signal to both said first and second one chip computer means after initialization of both said first and second one chip computer means;
   wherein said first one chip computer means has first end signal producing means for producing a first end signal when initialization of said first one chip computer means is completed, and said second one chip computer means starts the operation control program on the basis of said first end signal.

4. An image reproduction system, comprising:
   an image reproducing apparatus;
   a peripheral apparatus additionally attached to said reproducing apparatus;
   first one chip computer means provided with a data memory, a processor and a memory storing a program for operation control of said peripheral apparatus;
   second one chip computer means having a data memory, a processor and a memory storing a program for operation control of said image reproducing apparatus, for communicating data with said first one chip computer means; and
   means for allowing the start of the operation control program of both said first and second one chip computer means by sending a predetermined signal to both said first and second one chip computer means after initialization of both said first and second one chip computer means;
   wherein said first one chip computer means has first end signal producing means for producing a first end signal when initialization of said first one chip computer means is completed; and
   wherein said second one chip computer means has second end signal producing means for producing a second end signal when initialization of said second one chip computer means is completed, and said first and second one chip computer means start the operation control programs on the basis of both said first and second end signals.

5. A system according to claim 1, wherein said first reset means is capable of retaining a reset state of said first one chip computer means on the basis of said control signal even when said predetermined time period elapses.

6. A system according to claim 1, wherein said peripheral apparatus is a sorter.

7. A system according to claim 5, wherein said peripheral apparatus is a sorter.

8. A system according to claim 6, wherein said peripheral apparatus is a sorter.

* * * * *

UNITED STATES PATENT AND TRADEMARK OFFICE
CERTIFICATE OF CORRECTION

PATENT NO. : 4,967,377
DATED : October 30, 1990
INVENTOR(S) : SHUNICHI MASUDA

It is certified that error appears in the above-identified patent and that said Letters Patent is hereby corrected as shown below:

COLUMN 3

Line 31, "Control outputs $200_{OUT}$" should read --Control outputs $20_{OUT}$--.

COLUMN 6

Line 32, "output" should read --output port--.

COLUMN 10

Line 4, "program" should read --programs--.
    Line 29, "program" should read --programs--.
    Line 52, "claim 5," should read --claim 3,--.
    Line 54, "claim 6," should read --claim 4,--.

Signed and Sealed this

Fourteenth Day of July, 1992

Attest:

DOUGLAS B. COMER

Attesting Officer      Acting Commissioner of Patents and Trademarks